US011823505B1

(12) United States Patent
Benson et al.

(10) Patent No.: US 11,823,505 B1
(45) Date of Patent: Nov. 21, 2023

(54) DATA MANAGER

(71) Applicant: EMBARK TRUCKS, INC., San Francisco, CA (US)

(72) Inventors: Liam Benson, San Francisco, CA (US); Kashish Jain, North York (CA); Taehoon Kang, Alameda, CA (US)

(73) Assignee: EMBARK TRUCKS INC., San Francisco, CA (US)

( * ) Notice: Subject to any disclaimer, the term of this patent is extended or adjusted under 35 U.S.C. 154(b) by 0 days.

(21) Appl. No.: 18/148,768

(22) Filed: Dec. 30, 2022

(51) Int. Cl.
*G07C 5/00* (2006.01)
*G06F 16/21* (2019.01)

(52) U.S. Cl.
CPC .......... *G07C 5/008* (2013.01); *G06F 16/219* (2019.01)

(58) Field of Classification Search
CPC .............................. G07C 5/008; G06F 16/219
See application file for complete search history.

(56) References Cited

U.S. PATENT DOCUMENTS

2010/0123779 A1* 5/2010 Snyder ................. G07C 5/0866 386/241
2020/0327746 A1* 10/2020 Shimizu ................. G07C 5/085
2020/0410783 A1* 12/2020 Duarte Gelvez .... G07C 5/0841

* cited by examiner

*Primary Examiner* — Michael V Kerrigan
(74) *Attorney, Agent, or Firm* — Buckley, Maschoff & Talwalkar LLC

(57) ABSTRACT

A system and method including monitoring an available storage capacity of a data store onboard a vehicle and annotated data stored therein, the annotated data stored in the data store including event data associated with an operation of the vehicle; automatically deleting, in response to an indication of at least one of the available storage capacity of the data store and the annotated data stored therein, at least a portion of the data from the data store; and generating an output including an indication of a completion of the automatic deleting of the at least a portion of the data.

20 Claims, 10 Drawing Sheets

700

705 710 715

| REQUIREMENT | CRITERIA | NOTES |
|---|---|---|
| DATA EXPIRY | DELETE DATA > 72 HOURS AND NOT MARKED FOR TRANSMISSION | SPECIFIED BY DATA ANNOTATOR |
| TRANSMITTED DATA | DELETE DATA THAT HAS BEEN TRANSMITTED TO CLOUD INFRASTRUCTURE | SPECIFIED BY DATA TRANSMITTER |
| DATA STORE UTILIZATION | IF STORAGE UTILIZATION EXCEEDS A SPECIFIED THRESHOLD, DELETE DATA | THRESHOLD AND ORDER/TYPE OF DATA TO DELETE SPECIFIED BY DATA ANNOTATOR |
| | | |
| | | |
| | | |

FIG. 7

DATA MANAGER

BACKGROUND

Autonomous vehicles are motor vehicles capable of performing one or more necessary driving functions without a human driver's input, generally including Level 2 or higher capabilities as generally described in SAE International's J3016 Standard and including, in certain embodiments, self-driving trucks that include sensors, devices, and systems that may function together to generate sensor data indicative of various parameter values related to the position, speed, operating characteristics of the vehicle, and a state of the vehicle, including data generated in response to various objects, situations, and environments encountered by the autonomous vehicle during the operation thereof.

Vast amounts of sensor and other vehicle data to understand the road, the state of the vehicle, and the state of the environment around the vehicle may be generated and stored on-board an autonomous vehicle during on-road operation (i.e., one or more driving sessions, trips, etc.) of the vehicle. Typically, engineers and other interested entities would have to wait for the vehicle to complete its operational run(s) and return to a facility where data storage devices (e.g., disk dives, etc.) storing the data could be removed from the vehicle to retrieve the data therefrom or the stored data could be uploaded off the vehicle for further inspection, processing, and analysis.

In some instances, there might be a desire or need to, for example, observe or evaluate the performance of an autonomous vehicle during and after an operational run of the vehicle. As such, there exists a need for a robust system and method to efficiently and reliably manage the data associated with an operation of an autonomous vehicle that is continually generated and stored onboard the autonomous vehicle during an operational run of the vehicle to ensure, for example, secure storage of desired data.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 7 is an illustrative depiction of a data table corresponding to a configuration file, in accordance with an example embodiment.

Figure 1:
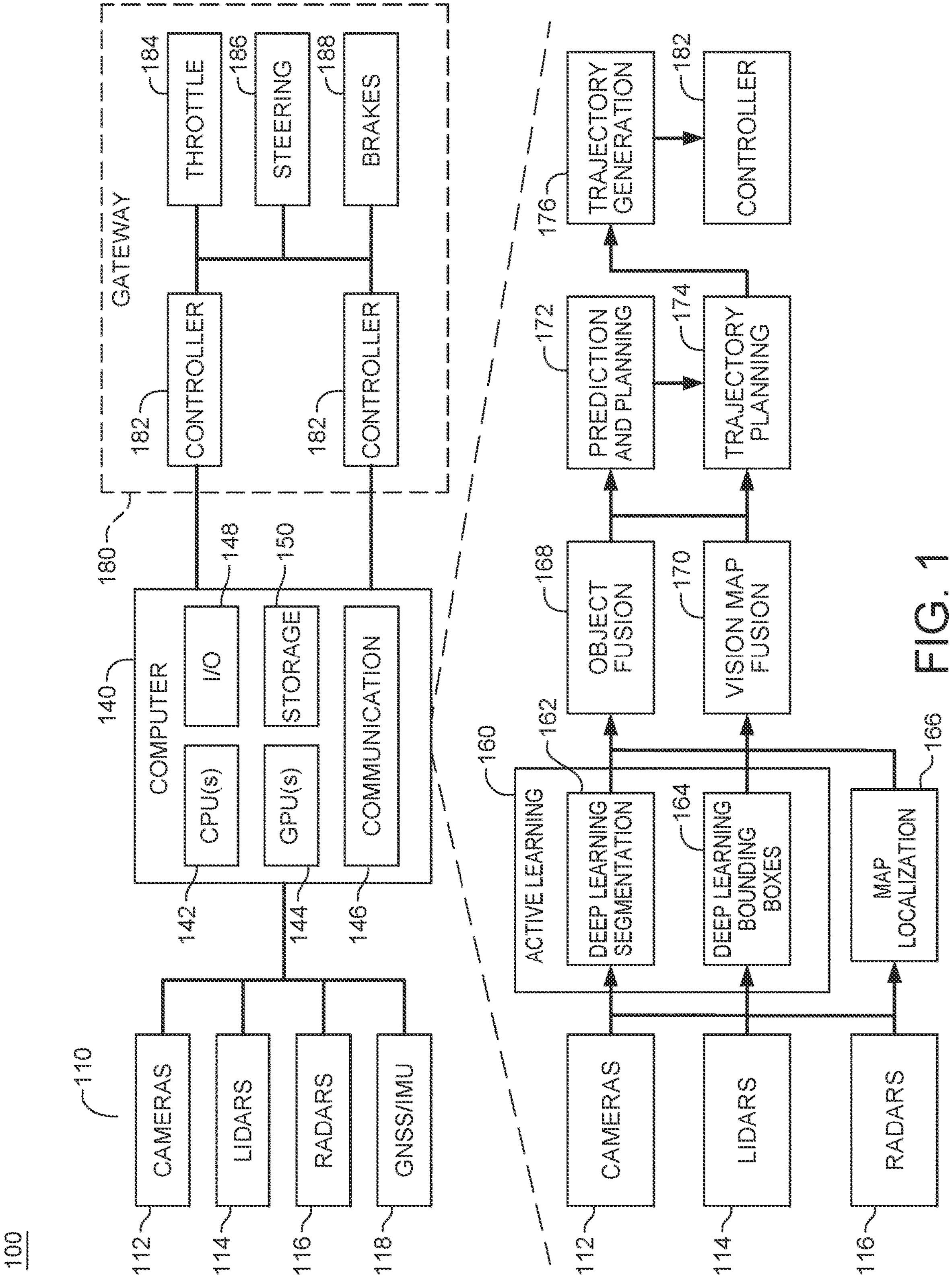
FIG. 1 is an illustrative block diagram of a control system that may be deployed in a vehicle, in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

For convenience and ease of exposition, a number of terms will be used herein. For example, the term "semi-truck" will be used to refer to a vehicle in which systems of the example embodiments may be used. The terms "semi-truck", "truck", "tractor", "vehicle" and "semi" may be used interchangeably herein. Further, as will become apparent to those skilled in the art upon reading the present disclosure, embodiments of the present invention may be used in conjunction with other types of vehicles. In general, embodiments may be used with desirable results in conjunction with any vehicle towing a trailer or carrying cargo over long distances.

Figure 2A:
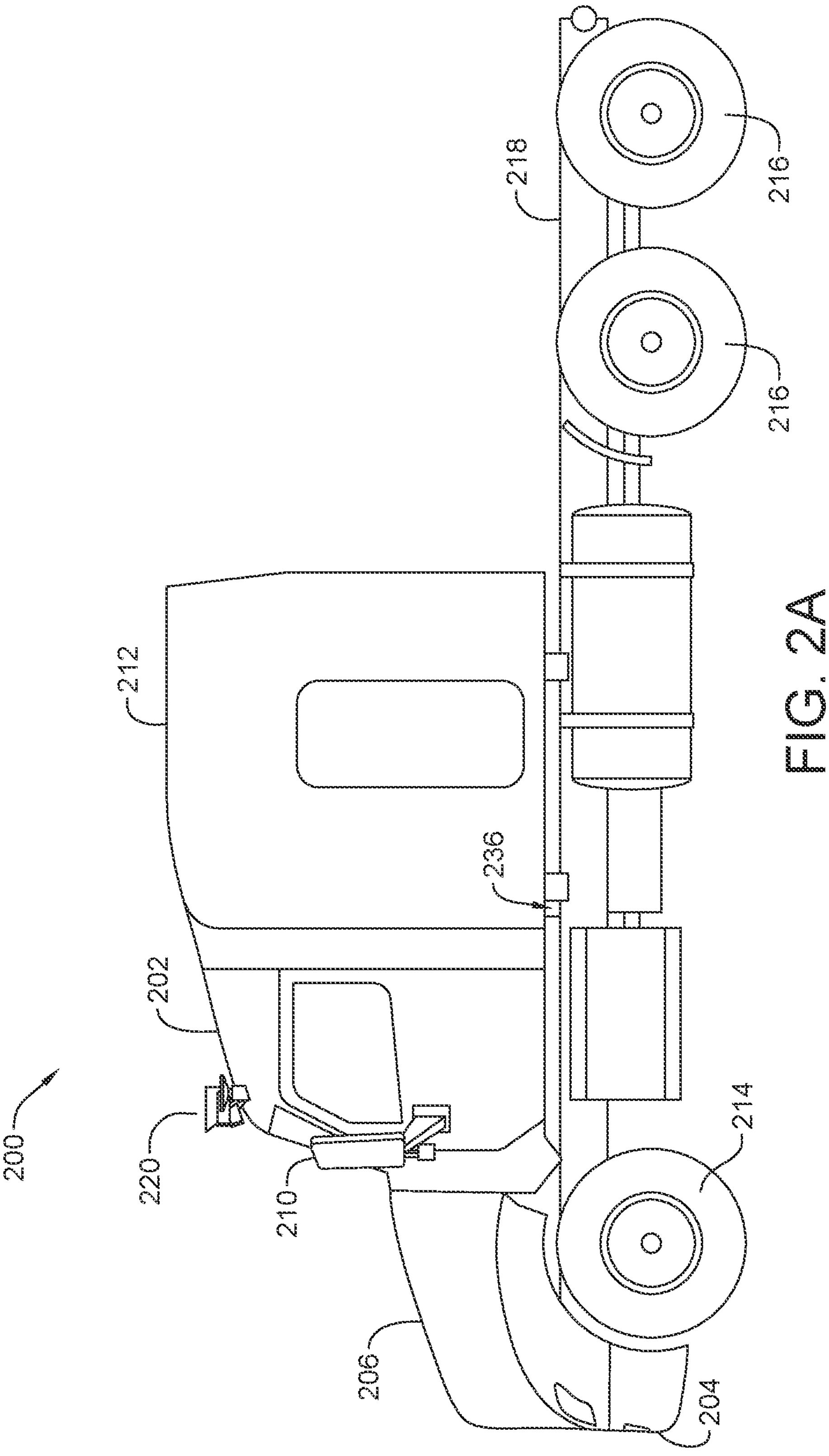
FIGS. 2A-2C are illustrative depictions of exterior views of a semi-truck, in accordance with example embodiments.
Figure 2B:
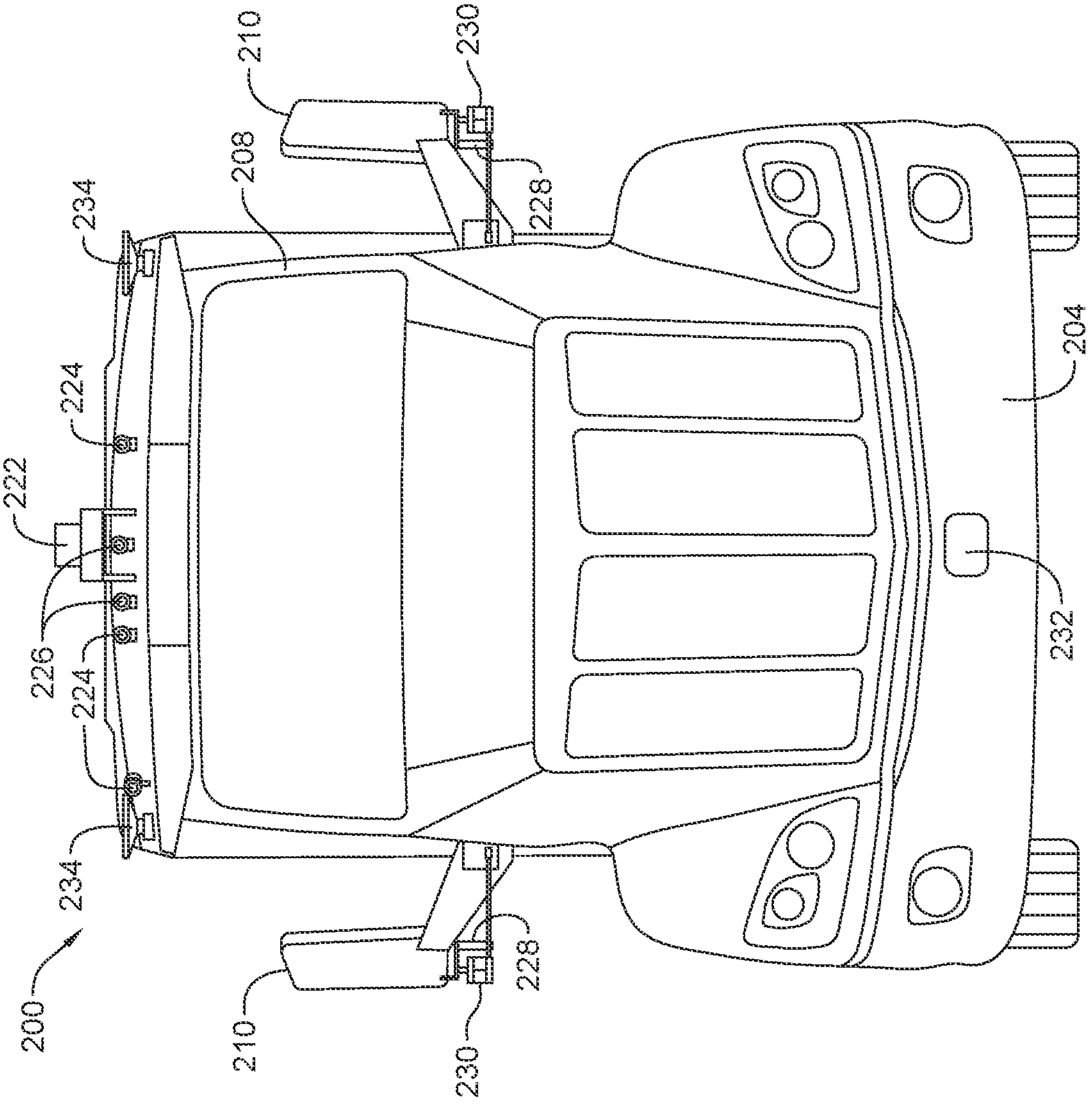
Figure 2C:
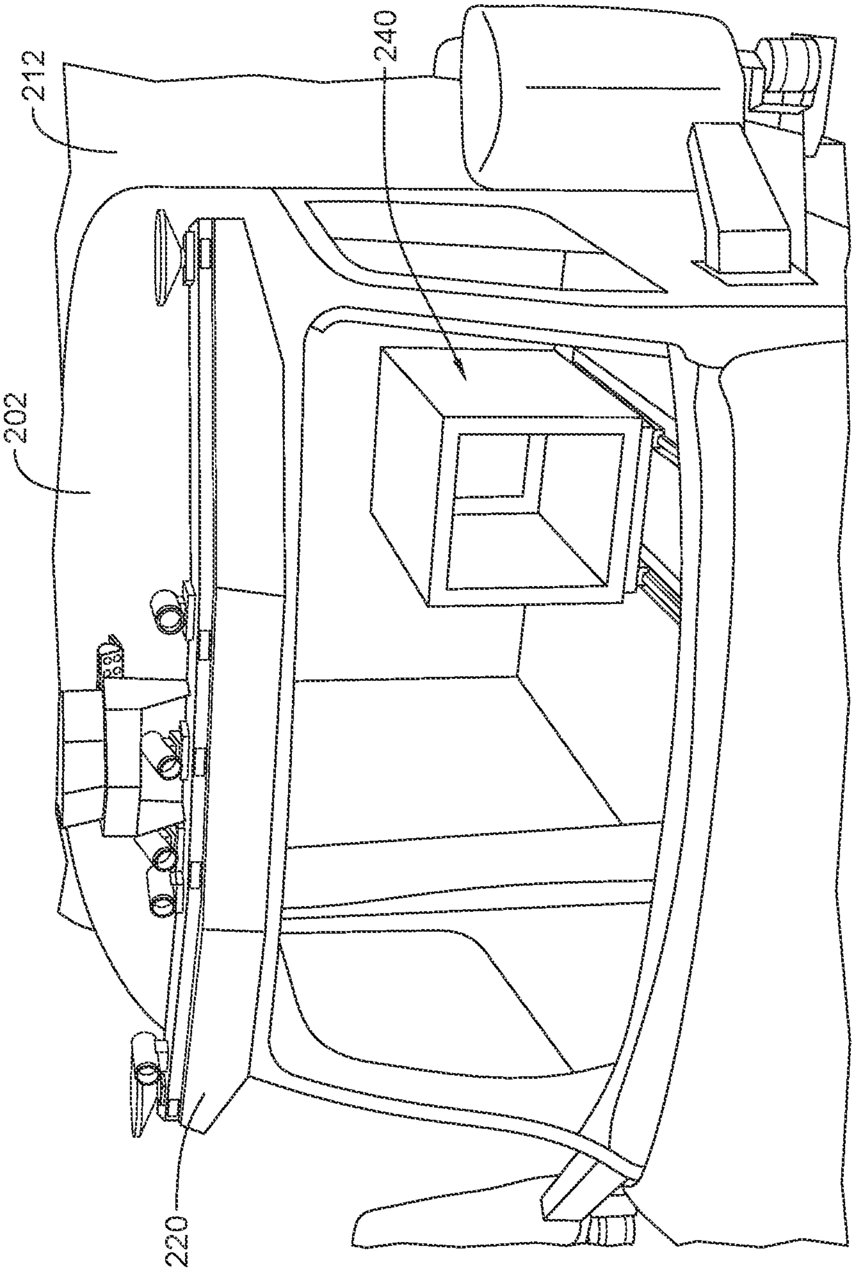

FIG. 1 illustrates a control system 100 that may be deployed in and comprise an autonomous vehicle (AV) such as, for example though not limited to, a semi-truck 200 depicted in FIGS. 2A-2C, in accordance with an example embodiment. Referring to FIG. 1, the control system 100 may include sensors 110 that collect data and information provided to a computer system 140 to perform operations including, for example, control operations that control components of the vehicle via a gateway 180. Pursuant to some embodiments, gateway 180 is configured to allow the computer system 140 to control different components from different manufacturers.

Computer system 140 may be configured with one or more central processing units (CPUs) 142 to perform processing, including processing to implement features of embodiments of the present invention as described elsewhere herein, as well as to receive sensor data from sensors 110 for use in generating control signals to control one or more actuators or other controllers associated with systems of the vehicle in which control system 100 is deployed (e.g., actuators or controllers allowing control of a throttle 184, steering systems 186, brakes 188 and/or other devices and systems). In general, control system 100 may be configured to operate the vehicle (e.g., semi-truck 200) in an autonomous (or semi-autonomous) mode of operation.

For example, control system 100 may be operated to capture images from one or more cameras 112 mounted at various locations of semi-truck 200 and perform processing (e.g., image processing) on those captured images to identify objects proximate to or in a path of the semi-truck 200. In some aspects, one or more lidars 114 and radar 116 sensors may be positioned on the vehicle to sense or detect the presence and volume of objects proximate to or in the path of the semi-truck 200. Other sensors may also be positioned or mounted at various locations of the semi-truck 200 to capture other information such as position data. For example, the sensors might include one or more satellite positioning sensors and/or inertial navigation systems such as GNSS/IMU 118. A Global Navigation Satellite System (GNSS) is a space-based system of satellites that provides the location information (longitude, latitude, altitude) and time information in all weather conditions, anywhere on or near the Earth to devices called GNSS receivers. GPS is the world's most used GNSS system and may be used interchangeably with GNSS herein. An inertial measurement unit ("IMU") is an inertial navigation system. In general, an inertial navigation system ("INS") measures and integrates orientation, position, velocities, and accelerations of a moving object. An INS integrates the measured data, where a GNSS is used as a correction to the integration error of the INS orientation calculation. Any number of different types of GNSS/IMU 118 sensors may be used in conjunction with features of the present invention.

The data collected by each of the sensors 110 may be processed by computer system 140 to generate control signals that might be used to control an operation of the semi-truck 200. For example, images and location information may be processed to identify or detect objects around or in the path of the semi-truck 200 and control signals may be transmitted to adjust throttle 184, steering 186, and/or brakes 188 via controller(s) 182, as needed to safely operate the semi-truck 200 in an autonomous or semi-autonomous manner. Note that while illustrative example sensors, actuators, and other vehicle systems and devices are shown in FIG. 1, those skilled in the art, upon reading the present disclosure, will appreciate that other sensors, actuators, and systems may also be included in system 100 consistent with the present disclosure. For example, in some embodiments, actuators that provide a mechanism to allow control of a transmission of a vehicle (e.g., semi-truck 200) may also be provided.

Control system 100 may include a computer system 140 (e.g., a computer server) that is configured to provide a computing environment in which one or more software, firmware, and control applications (e.g., items 160-182) may be executed to perform at least some of the processing described herein. In some embodiments, computer system 140 includes components that are deployed on a vehicle (e.g., deployed in a systems rack 240 positioned within a sleeper compartment 212 of the semi-truck as shown in FIG. 2C). Computer system 140 may be in communication with other computer systems (not shown) that might be local to and/or remote from the semi-truck 200 (e.g., computer system 140 might communicate with one or more remote terrestrial or cloud-based computer system via a wireless communication network connection).

According to various embodiments described herein, computer system 140 may be implemented as a server. In some embodiments, computer system 140 may be configured using any of a number of computing systems, environments, and/or configurations such as, but not limited to, personal computer systems, cloud platforms, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like.

Different software applications or components might be executed by computer system 140 and control system 100. For example, as shown at active learning component 160, applications may be provided that perform active learning machine processing to process images captured by one or more cameras 112 and information obtained by lidars 114. For example, image data may be processed using deep learning segmentation models 162 to identify objects of interest in the captured images (e.g., other vehicles, construction signs, etc.). In some aspects herein, deep learning segmentation may be used to identify lane points within the lidar scan. As an example, the system may use an intensity-based voxel filter to identify lane points within the lidar scan. Lidar data may be processed by machine learning applications 164 to draw or identify bounding boxes on image data to identify objects of interest located by the lidar sensors.

Information output from the machine learning applications may be provided as inputs to object fusion 168 and vision map fusion 170 software components that may perform processing to predict the actions of other road users and to fuse local vehicle poses with global map geometry in real-time, enabling on-the-fly map corrections. The outputs from the machine learning applications may be supplemented with information from radars 116 and map localization 166 application data (as well as with positioning data). In some aspects, these applications allow control system 100 to be less map reliant and more capable of handling a constantly changing road environment. Further, by correcting any map errors on-the-fly, control system 100 may facilitate safer, more scalable and more efficient operations as compared to alternative map-centric approaches.

Information is provided to prediction and planning application 172 that provides input to trajectory planning 174 components allowing a trajectory to be generated by trajectory generation system 176 in real time based on interactions and predicted interactions between the semi-truck 200 and other relevant vehicles in the trucks operating environment. In some embodiments, for example, control system 100 generates a sixty second planning horizon, analyzing relevant actors and available trajectories. The plan that best fits multiple criteria (including safety, comfort and route preferences) may be selected and any relevant control inputs needed to implement the plan are provided to controller(s) 182 to control the movement of the semi-truck 200.

In some embodiments, these disclosed applications or components (as well as other components or flows described herein) may be implemented in hardware, in a computer program executed by a processor, in firmware, or in a combination of the above, unless otherwise specified. In some instances, a computer program may be embodied on a computer readable medium, such as a storage medium or storage device. For example, a computer program, code, or instructions may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of non-transitory storage medium known in the art.

A non-transitory storage medium may be coupled to a processor such that the processor may read information from, and write information to, the storage medium. In an alternative, the storage medium may be integral to the processor. The processor and the storage medium may reside in an application specific integrated circuit ("ASIC"). In an alternative embodiment, the processor and the storage medium may reside as discrete components. For example, FIG. 1 illustrates an example computer system 140 that may represent or be integrated in any of the components disclosed hereinbelow, etc. As such, FIG. 1 is not intended to suggest any limitation as to the scope of use or functionality of embodiments of a system and method disclosed herein. Computer system 140 is capable of being implemented and/or performing any of the functionality disclosed herein.

Computer system 140 may be described in the general context of computer system-executable instructions, such as program modules, being executed by a computer system. Generally, program modules may include routines, programs, objects, components, logic, data structures, and so on that perform particular tasks or implement particular abstract data types. Computer system 140 may be implemented in distributed cloud computing environments where tasks are performed by remote processing devices that are linked through a communications network. In a distributed cloud computing environment, program modules may be located in both local and remote computer system storage media including non-transitory memory storage devices.

Referring to FIG. 1, computer system 140 is shown in the form of a general-purpose computing device. The components of the computer system 140 may include, but are not limited to, one or more processors (e.g., CPUs 142 and GPUs 144), a communication interface 146, one or more input/output interfaces 148, and one or more storage devices 150. Although not shown, computer system 140 may also include a system bus that couples various system components, including system memory, to CPUs 142. In some embodiments, input/output (I/O) interfaces 148 may also include a network interface. For example, in some embodiments, some or all of the components of the control system 100 may be in communication via a controller area network ("CAN") bus or the like interconnecting the various components inside of the vehicle in which control system 100 is deployed and associated with.

In some embodiments, storage device 150 may include a variety of types and forms of non-transitory computer readable media. Such media may be any available media that is accessible by computer system/server, and it may include both volatile and non-volatile media, removable and non-removable media. System memory, in one embodiment, implements the processes represented by the flow diagram (s) of the other figures herein. The system memory can include computer system readable media in the form of volatile memory, such as random access memory (RAM) and/or cache memory. As another example, storage device 150 can read and write to a non-removable, non-volatile magnetic media (not shown and typically called a "hard drive"). Although not shown, the storage device 150 may include one or more removable non-volatile disk drives such as magnetic, tape or optical disk drives. In such instances, each can be connected to the bus by one or more data media interfaces. Storage device 150 may include at least one program product having a set (e.g., at least one) of program modules, code, and/or instructions that are configured to carry out the functions of various embodiments of the application.

FIGS. 2A-2C are illustrative depictions of exterior views of a semi-truck 200 that may be associated with or used in accordance with example embodiments. Semi-truck 200 is shown for illustrative purposes only. As such, those skilled in the art, upon reading the present disclosure, will appreciate that embodiments may be used in conjunction with a number of different types of vehicles and are not limited to a vehicle of the type illustrated in FIGS. 2A-2C. The example semi-truck 200 shown in FIGS. 2A-2C is one style of truck configuration that is common in North American that includes an engine 206 forward of a cab 202, a steering axle 214, and two drive axles 216. A trailer (not shown) may typically be attached to semi-truck 200 via a fifth-wheel trailer coupling that is provided on a frame 218 and positioned over drive axles 216. A sleeper compartment 212 may be positioned behind cab 202, as shown in 2A and 2C. FIGS. 2A-2C further illustrate a number of sensors that are positioned at different locations of semi-truck 200. For example, one or more sensors may be mounted on a roof of cab 202 on a sensor rack 220. Sensors may also be mounted on side mirrors 210, as well as other locations of the semi-truck. Sensors may be mounted on a bumper 204, as well as on the side of the cab 202 and other locations. For example, a rear facing radar 236 is shown as being mounted on a side of the cab 202 in FIG. 2A. Embodiments may be used with other configurations of trucks and other vehicles (e.g., such as semi-trucks having a cab over or cab forward configuration or the like). In general, and without limiting embodiments of the present disclosure, features of the present invention may be used with desirable results in vehicles that carry cargo over long distances, such as long-haul semi-truck routes.

FIG. 2B is a front view of the semi-truck 200 and illustrates a number of sensors and sensor locations. The sensor rack 220 may secure and position several sensors above windshield 208 including a long range lidar 222, long range cameras 224, GPS antennas 234, and mid-range front facing cameras 226. Side mirrors 210 may provide mounting locations for rear-facing cameras 228 and mid-range lidar 230. A front radar 232 may be mounted on bumper 204. Other sensors (including those shown and some not shown) may be mounted or installed on other locations of semi-truck 200. As such, the locations and mounts depicted in FIGS. 2A-2C are for illustrative purposes only.

Referring now to FIG. 2C, a partial view of semi-truck 200 is shown that depicts some aspects of an interior of cab 202 and the sleeper compartment 212. In some embodiments, portion(s) of control system 100 of FIG. 1 might be deployed in a systems rack 240 in the sleeper compartment 212, allowing easy access to components of the control system 100 for maintenance and operation.

Particular aspects of the present disclosure relate to a method and system providing a framework or architecture for specifying triggers that indicate whether an incident of interest has occurred and further automatically provide, in real-time as an autonomous vehicle, AV, (e.g., a truck similar to that disclosed in FIGS. 1 and 2A-2C) is being operated (e.g., driven), a mechanism to capture and reliably upload a specific set of data for immediate access to the specific set of data. The disclosed framework may be used to provide insights into the status of the AV and its surrounding environment as the AV is being operated, as well as quicker (i.e., real-time) access to some set of data captured by the AV. Aspects of the present disclosure provide, in general, a framework to access specific sets of data corresponding to predefined events as the specific data is being sensed, generated, or collected at the AV during an operation of the AV.

Figure 3:
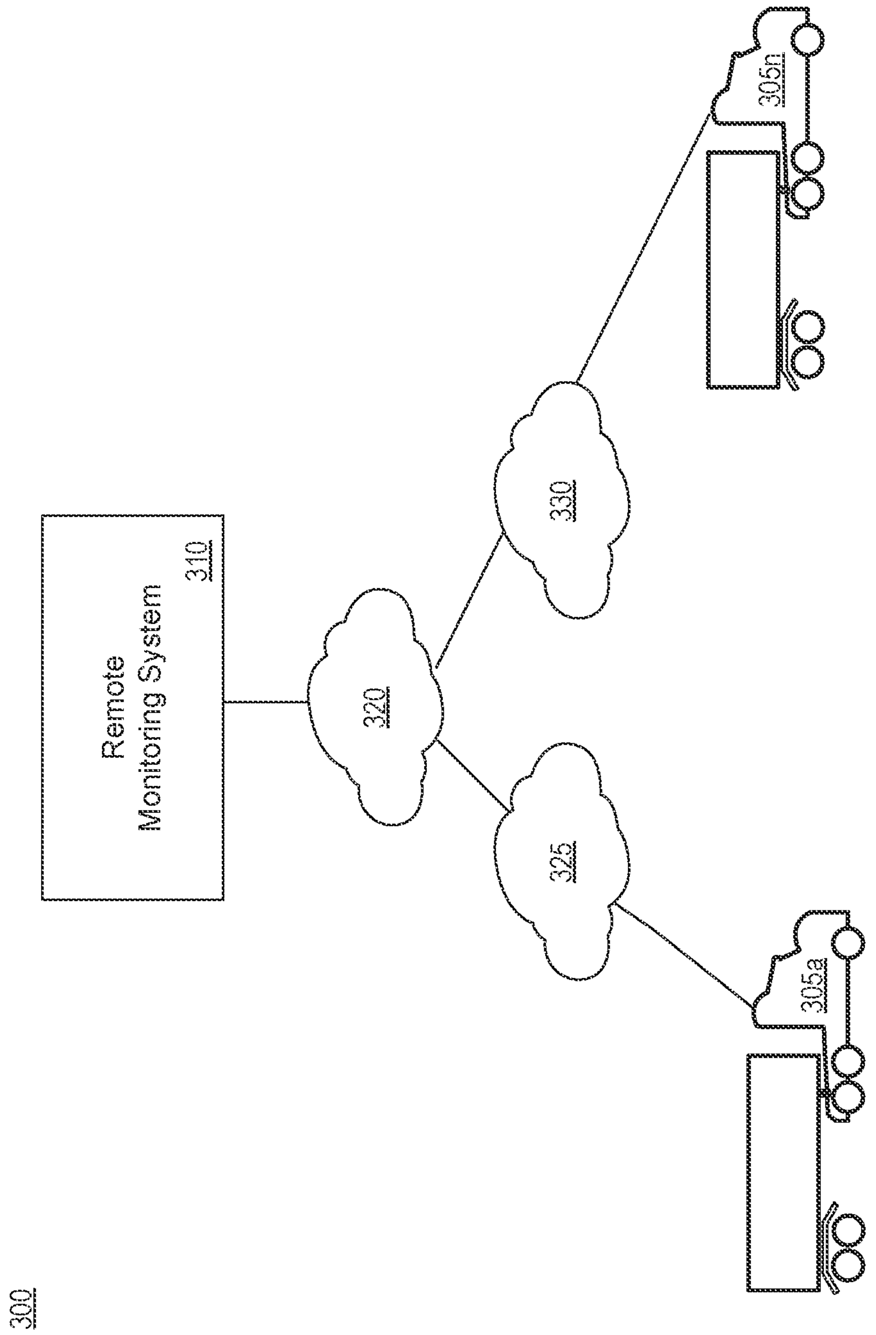
FIG. 3 is an illustrative depiction of a communication environment in which an autonomous vehicle may operate, in accordance with an example embodiment.

FIG. 3 is an illustrative depiction of an environment in which an autonomous vehicle may operate, in accordance with an example embodiment. As shown in FIG. 3, a system 300 may include one or more AVs (e.g., semi-trucks) **305*a-n* that are in communication with a remote monitoring system 310 via networks 320, 325, and 330. In the example of FIG. 3, AV 305*a* communicates with remote monitoring system 310 via network 325** (e.g., a first cellular network or cell)

and network 320, whereas AV 305*n* communicates with remote monitoring system 310 via network 330 (e.g., a second cellular network or cell) and network 320. In some instances, network 320 may comprise one or more different networks (not shown), where those different communication networks are collectively represented by network 320 since the number or types of the network(s) might change, for example, as AVs 305*a-n* traverse different roadways.

In some instances, an AV might record all of the sensor and other system data generated by its embedded sensors (e.g. cameras, lidars, radars, etc.), control systems (e.g., steering, braking, etc.), and processing systems (e.g., planning software, prediction software, perception software, etc.) on an onboard memory device (e.g., FIG. 1, semi-truck storage 150), generally referred to herein as a data store that might include one or more disk drives, memories, files, and the like. The quantity of all of this data may typically be very large (e.g., 150 MBps) and may be stored on the AV until it completes its operations. In some aspects, embodiments disclosed herein are configured to reliably transmit data associated with operating the AV (e.g., sensor and other data generated and stored onboard the AV) to a remote monitoring system as the data is being captured (i.e., during the operation of the AV) or some time thereafter by transmitting a specific set of data to remote monitoring system 310 or other infrastructure for, as an example, inspection, analysis, and further processing. In some instances, the remote monitoring system or other infrastructure might include a cloud computing infrastructure.

In some aspects, the specific set of data transmitted to the remote monitoring system may be a particular, defined subset of the data generated and stored onboard the AV. In some aspects, the present disclosure relates to systems and methods to efficiently and reliably manage the data generated by the AV and stored in the data store of the AV to ensure, for example, that sufficient free space is maintained in the data store to accommodate the generated data as well as new data that might be generated during the operation (e.g., a continuing operation) of the AV. In some embodiments, as described in greater detail below, the present disclosure includes systems and methods to manage data generated by and stored on an AV, including monitoring an available storage capacity of the AV's onboard data store and automatically (i.e., without human interaction) deleting at least a portion of the data generated by and stored on the AV. In some embodiments, the disclosed systems and methods may be capable of automatically executing the functions they are configured to execute without a need for interaction with a human.

Figure 4:
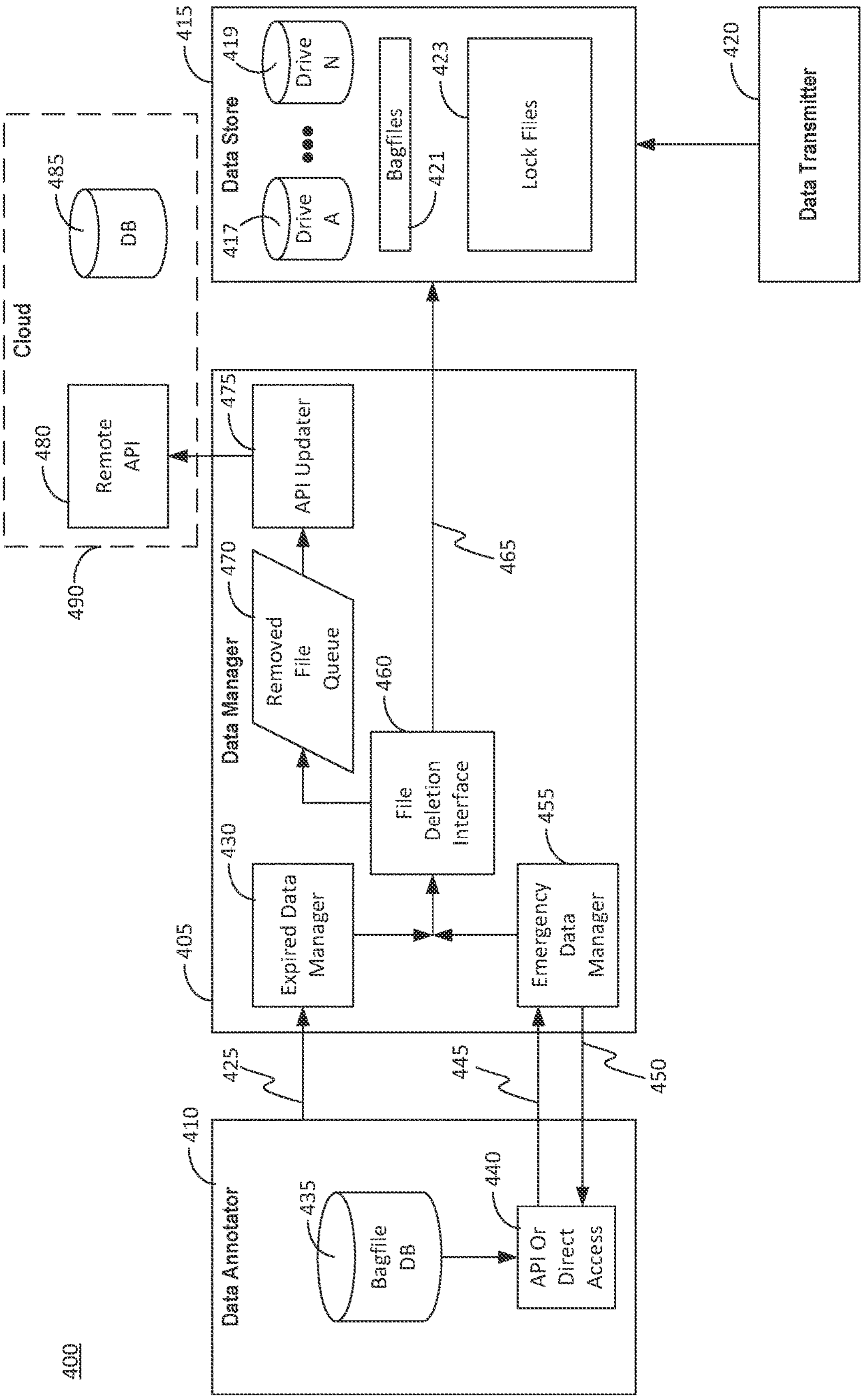
FIG. 4 is an illustrative block diagram illustrating aspects of a system, in accordance with an example embodiment.

Reference is now made to FIG. 4 where an illustrative system architecture block diagram 400 depicts a data manager 405 associated with an AV (e.g., FIG. 3, AV 305). In one practical application, a data manager 405, a data annotator system 410, a data store 415, and a data transmitter 420 shown in FIG. 4 may be deployed on a vehicle in conjunction with other vehicle sensors and systems, for example such as those shown in the semi-truck 200 disclosed in FIGS. 2A-2C, as well as the control system 100 of FIG. 1. In some embodiments, data manager 405, data annotator system 410, data store 415, and data transmitter 420 may be executed by the primary vehicle compute, where these systems need not be attached to the vehicle's self-driving code. The primary vehicle compute may be on during operational runs of the AV.

In some aspects, data manager 405 may cooperatively interact with data annotator system 410, data store 415, and data transmitter 420 to effectively manage the data generated and stored by an AV herein. Data annotator system 410 may cooperatively in conjunction with other vehicle sensors and systems. In general, data annotator system 410 operates to keep track of all of the data being created and recorded by the AV and annotates the data, including, for example, annotating the data with a priority and an indication of whether the data should be deleted.

Data manager 405 may generally manage the data (e.g., data files or records) stored by the AV by deleting specific files or records (i.e., portions) of the data based on a combination of factors. The combination of factors may include, for example, an available storage capacity of the data store (i.e., storage utilization), an age (i.e., expiry) of the data, and annotations associated with (e.g., assigned to) the data. In some instances, the age of a particular file or record of the data (e.g., a file representing event data generated by one or more sensors and devices of an AV herein, where the event data may be formatted as a bag file) might be represented by an annotation associated with the file or record, where the annotation may include an indication of the age of the file or record. In some instances, annotations associated with a file or record of the AV generated data might include an indication of whether the file or record should be deleted or not deleted. The indication of whether the file or record should be deleted or not deleted might be represented by an explicit instruction to delete the file, or a flag, a value, or other indicia that may be interpreted or determined to indicate the file or record should be deleted or not deleted. In some instances, the interpretation or determination of the meaning of the flag, value, or other indicia might be specified by a rule, specification, lookup table, or analysis of the flag, value, or other indicia.

Data transmitter 420 may generally operate to upload or otherwise transmit data (e.g., one or more data files or records) designated for transmission to a remote monitoring system or other remote infrastructure (e.g., cloud 490). In some embodiments, data transmitter 420 may read data from data store 415 (and the drives therein) and upload or transmit it to the remote monitoring system or other remote infrastructure (e.g., cloud 490). The data may be uploaded or transmitted based on the available storage capacity of the data store (i.e., storage utilization), the age (i.e., expiry) of the data, and annotations associated with (e.g., assigned to) the data.

In some instances, an embodiment of data store 415 might be implemented by one or more storage devices, such as drive A (417) through drive N (419). In one embodiment, the one or more drives might collectively have a storage capacity of about 36 terabytes (TB), although other storage capacities may be provided. The one or more drives comprising the data store might be implemented using different types of non-volatile memory to persist the data generated by an AV herein. For example, in some embodiments the drive(s) of the data store might comprise a Serial Advanced Technology Attachment (SATA) solid state device (SSD), Non-Volatile Express (NVMe), and memory of other form factors and communication interfaces that might have write speeds of at least a minimum value (e.g., ≥300 MB/s, but ≥600 MB/s in some instances). In some instances, the data store might be implemented to be tamper-resistant to safeguard the data stored therein.

In some aspects, data manager 405 may operate to ensure that all AV data that is to be offloaded of the vehicle is retained onboard the vehicle until it can be successfully transmitted to a remote monitoring system or other specified destination (e.g., cloud computing infrastructure 490 that provides resources for an enterprise's backend infrastructure). While the data manager herein may retain certain data, the data manager may also operate to delete other AV data from the onboard data store in accordance with a predefined data retention policy.

In some embodiments, data annotation system 410 is configured to annotate or otherwise associate a label with a data file or record (e.g., a flag or other indicia in a header of the data file or record) that indicates whether the data file or record should be deleted or not deleted. In some aspects, data annotation system 410 may include or access a bag file database 440, wherein the data annotation system tracks all of the AV associated data generated on the AV (and stored, in some embodiments, as bag files). Data annotation system 410 may further include an application programming interface (API) or direct access interface 440 to facilitate communication between the data annotation system and the data manager. In some embodiments, a data file may be annotated for deletion, wherein an absence of the specific annotation for deletion may be interpreted or determined to indicate this particular data file is to be retained. In some other embodiments, a data file may be annotated for retention, wherein an absence of the specific annotation for retention may be interpreted or determined to indicate that this subject data file may be deleted, if need be (e.g., a data file not specifically marked for retention may be deleted if storage capacity of the AV's data store has exceeded a specified threshold or the data file is to be deleted to adhere to a data retention policy for the AV).

Referring again to data manager 405, emergency data manager process 455 may be provided to monitor or poll API 440 for indication(s) that the storage utilization capacity of the data store has exceeded its specified storage utilization threshold. In some embodiments, emergency data manager process 455 might directly interface with data store 415 (and the drives therein) to determine whether the data store has exceeded its specified storage utilization threshold. For example, emergency data manager process 455 be monitoring the one or more drives to which AV associated data is being recorded is more than 90% full (i.e., the specified storage utilization threshold for the example AV data store). In response to an indication, via a message at 445, that the one or more drives (or data store 415 as an entity) has exceeded the specified storage utilization threshold value, emergency data manager process 455 may commence querying API or direct access interface 440, wherein it asks API or direct access interface 440 to notify it of the highest priority bag file on the current disk recording AV associated data (i.e., the highest priority bag file for deletion). The definition of priority may be managed by one of or a combination of bag files database 435 and data annotator system 410. In some aspects, emergency data manager process 455 might delete, via file deletion interface 460, the indicated highest priority bag file from data store 415. In some aspects, data manager 405 may notify the data annotation system, via a message at 450, that it has deleted the bag file it was notified of via the message at 445 and request the data annotation system to provide an indication of a next bag file to delete, as needed to adhere to the data storage utilization policy. In some instances, the data annotation system and the data manager may iteratively interact with each other to delete data files until the available storage capacity of the data store (or one or more drives thereof) is below the threshold specified by the data storage utilization policy as implemented by the data annotation system. For example, in the current example where the data storage utilization policy specifies a maximum data store (or drives(s) thereof) utilization threshold of 90%, bag files may continue to be identified by the data annotation system for deletion and the data manager may continue to delete such identified data files until the data store (or drives(s) thereof) have at least 10% of their storage capacity available as free space. In some embodiments, the data annotation system and the data manager may continue to delete data files until the specified utilization threshold and an additional quantity of free data storage capacity (e.g., +5% of the overall storage capacity of the data store or drives(s) thereof) is achieved. In response to the data manager deleting sufficient file(s) to satisfy the data storage utilization policy, the emergency data manager process 455 may return to a "sleep" state where it at least periodically polls API or direct access interface 440, as opposed to actively deleting files.

In some embodiments, data manager 405 may operate to manage data stored onboard the AV consistent with the annotations or labeling provided by data annotation system 410. For example, if a data file is annotated for deletion by the data annotation system, the data manager 405 will proceed to delete the data file. In the instance a data file is not annotated for deletion by the data annotation system, then the data manager might not delete the data file.

In some embodiments, data manager 405 may also operate to manage data stored onboard the AV consistent with a data storage utilization policy or specification. The data storage utilization policy may be defined to specify that the data store of AV does not exceed a threshold occupied capacity (e.g., 90% full). That is, the data storage utilization policy might state that the data store is to maintain at least 10% of free or available space for future AV operations associated data. In some aspects, the data storage utilization policy might specify an expiry or age limit for data otherwise not required to be retained by the AV data store. In an illustrative example, the data storage utilization policy might specify that AV data not otherwise required to be retained that exceeds a maximum threshold age (e.g., 72 hours) is to be deleted. In this example, data manager 405 herein may proceed to delete an AV data file that is older than the specified maximum threshold age (e.g., 72 hours, but this may be a configurable variable that can have other another value as set by an authorized entity or personnel) and not otherwise marked or annotated for retention. In some embodiments, a data file, record, or other data structure that is marked, annotated, or otherwise designated to be transmitted will be retained at least until it is transmitted from the system by data transmitter 420. In some aspects, the data storage utilization policy might specify at least one of (i) one or more types of data to delete and (ii) an ordered sequence of deleting the one or more specified types of data. For example, the data storage utilization policy may specify certain data stored by the AV may be deleted (e.g., data older than the specified maximum threshold age and not otherwise marked for transmission, no-context data, and product metric data, etc.) and an ordered sequence in which the different types of data should be deleted. For example, the data storage utilization policy may specify deleting data in the following order (1) data older than the specified maximum threshold age and not otherwise marked for transmission (e.g., do not delete product metric data, triage data, and other data that is automatically marked for transmission), (2) no-context event data, and (3) product metric data. In some embodiments, the data storage utilization policy may specify that certain data stored by the AV may not be deleted. That is, the data storage utilization policy may specify that certain types of data stored by the AV may not be intentionally deleted by data manager 405. In some embodiments, data annotation system 410 may operate not to annotate certain types of data (e.g., AV intervention data, AV on-demand request data, etc.) for deletion, in accordance with the data storage utilization policy. Accordingly, data manager 405 that operates to delete data based on the annotations associated with the data may not delete the certain types of data that are specifically not annotated for deletion by the data annotation system.

In some embodiments, data that has been successfully uploaded from the AV to a remote monitoring system 310 or other designated infrastructure (e.g., cloud 490) may be deleted from the data store 415. This aspect of managing the data of the AV may be included in the data retention policy or independent thereof. In some embodiments, when a data file, record, or other data structure is transmitted from the AV by data transmitter 420, the data transmitter may provide a record or indication (e.g., an annotation, acknowledgement, etc.) that the data file, record, or other data structure has been successfully transmitted. Based on such a record or indication provided by the data transmitter, the data manager may proceed to delete the previously transmitted data file, record, or other data structure.

In some aspects, a data manager in some embodiments herein might not operate to record or transmit data, as these functions may be executed by a data annotation system and a data transmitter herein, respectively. In some aspects, a data manager herein might delete (or not delete) a data file based on the annotations associated with the data file and the storage utilization policy of the AV, where the data file may be annotated by the data annotation system and the data transmitter and the storage utilization policy may be implemented by the data annotation system executing or referencing a configuration file that specifies the storage utilization policy. For example, a data annotation system 410 herein might annotate a data file for deletion that is older than the expiry age specified in the storage utilization policy and not otherwise (automatically) marked or designated to be transmitted, wherein the data manager 405 will delete the data file annotated for deletion.

Referring still to FIG. 4, data files representing the AV event data created onboard the AV and associated with an operation of the AV are stored in data store 415. The data files, formatted in some instances as bag files 421, may be persisted across one or more of drives 417 and 419 onboard the AV. Data manager 405 may be configured to automatically delete one or more of the data files based on a combination of a specified data expiry, a storage utilization policy, and a data upload status of the data. In some embodiments, the storage utilization policy may be defined in a configuration file leveraged by an execution of data annotation system 410, wherein the data expiry may be specified in the configuration file (optionally as a part of the storage utilization policy). In some aspects, data annotation system 410 may send pointers to bag files 421 when particular bag files are older than the specified expiry time (e.g., 72 hours). For example, when a bag file that has not been marked (annotated) for transmission and is older than the specified expiry time, that bag file may be pushed into queue 425 that can be monitored by expired data manager process 430 (e.g., a worker thread, method, service, etc.). In some aspects, expired data manager process 430 may monitor or poll queue 425 for an indication of data files that are expired. In the instance the data annotation system 410 provides an indication that a data file is expired, expired data manager process 430 retrieve that data file from the data store and proceed to delete that file. Expired data manager process 430 may leverage file deletion interface 460 to delete the subject data file (e.g., bag file) from data store 415.

Regarding some aspects of file deletion interface 460, the file deletion interface may be implemented as a process, worker thread, method, or service defined such that both the expired data manager process 430 and the emergency data manager process 455 may directly call or otherwise invoke it from within their respective process. In some aspects, file deletion interface 460 provides, in part, a mechanism for data manager process 430 and emergency data manager process 455 to lock a bag file for deletion. By placing an exclusive lock on a data file, data manager process 430 and data manager process 455 may proceed to delete a data file without interference from other processes or systems. In one embodiment, a process, worker thread, or service may be defined that is called or executed to obtain an exclusive lock on a data file to be deleted by data manager process 430 or the emergency data manager process 455. For example, in an instance the data manager (via data manager process 430 or the emergency data manager process 455) is deleting data, the data manager 405 will try to obtain an exclusive lock on the particular bag file(s) that are being deleted. When the data manager 405 is able to obtain an exclusive lock on the particular bag files, then the data manager system can delete the subject files while other processes or systems are prevented from accessing or changing the subject file(s). In some aspects, the particular process, technique, or logic used to implement the exclusive lock might vary so long as the desired functionality of the exclusive lock as disclosed herein is achieved.

In some aspects, data transmitter 420 provides, in part in some embodiments, a mechanism for data transmitter 420 to lock a bag file for transmission thereof. By placing an exclusive lock on a data file, the data transmitter may proceed to transmit a data file without interference from other processes or systems. In one embodiment, a process, worker thread, or service may be defined that is called or executed to obtain an exclusive lock on a data file to be transmitted by data transmitter 420. For example, in an instance data transmitter 420 is uploading or transmitting data, data transmitter 420 will try to obtain an exclusive lock on the particular bag file(s) that are being transmitted. When data transmitter 420 is able to obtain an exclusive lock on the particular bag files, then the data transmitter system can transmit the subject files while other processes or systems are prevented from accessing or changing the subject file(s). After transmitting the subject file(s), data transmitter 420 may proceed to delete the file(s). In some aspects, the particular process, technique, or logic used to implement the exclusive lock might vary so long as the desired functionality of the exclusive lock as disclosed herein is achieved.

In some embodiments, if data manager 405 (via data manager process 430 or the emergency data manager process 455) or data transmitter system 420 fails to obtain an exclusive lock on a particular data file, then the data manager 405 or data transmitter system 420 knows the opposing system owns the exclusive lock for the subject data file(s). In such a scenario, the system failing to obtain the exclusive lock assumes the opposing system(s) owns the exclusive lock for the subject data file(s) and further ends its own process to delete or transmit the data, respectively. The system failing to obtain the exclusive lock ends its process to delete or transmit the data since the opposing system owning the exclusive to the data file(s) will process the data file(s). For example, if the data manager 405 (via data manager process 430 or the emergency data manager process 455) fails to obtain an exclusive lock on a particular data file, it ends its process to delete the particular file(s) since the data transmitter system 420 has the exclusive lock on the particular data file(s), will transmit the particular data file(s), and delete the particular data file(s) (e.g., bagfiles) after transmission. In one embodiment, the data transmitter system 420 might indicate to the data manager 405 (or another system, device, worker thread, or method) that the data transmitter system transmitted the particular data file(s) and those files may be deleted. Alternatively for example, if the data transmitter system 420 fails to obtain an exclusive lock on a particular data file, it stops its process to transmit the particular file since the data manager 405 (via data manager process 430 or the emergency data manager process 455) has the exclusive lock on the particular data file and will accordingly delete the particular data file. As such, the data transmitter need not be concerned with transmitting the particular file that is locked by the data manager herein for deletion. In some aspects, the acts of obtaining the exclusive lock and deleting file(s) by file deletion interface 460 is illustrated by the connection 465 between the file deletion interface and data store 415. In the event the file deletion interface 460 is able to successfully delete the file after obtaining the lock, then the file deletion interface 460 may publish a message to the removed file queue 470 indicating the file has been deleted. The message published to the removed file queue 470 indicating that the file has been deleted may be picked up by API updater process 475 that can further update remote API 480 that that data file(s) (e.g., bag file(s)) were deleted on the AV. In some embodiments, the remote monitoring system, as represented by the cloud computing infrastructure 490 in FIG. 4 may include a remote database 485 that may include data files transmitted from the AV by data transmitter 420, as well as, for example, reporting and analytical data regarding the files deleted by the data manager 405.

Figure 5:
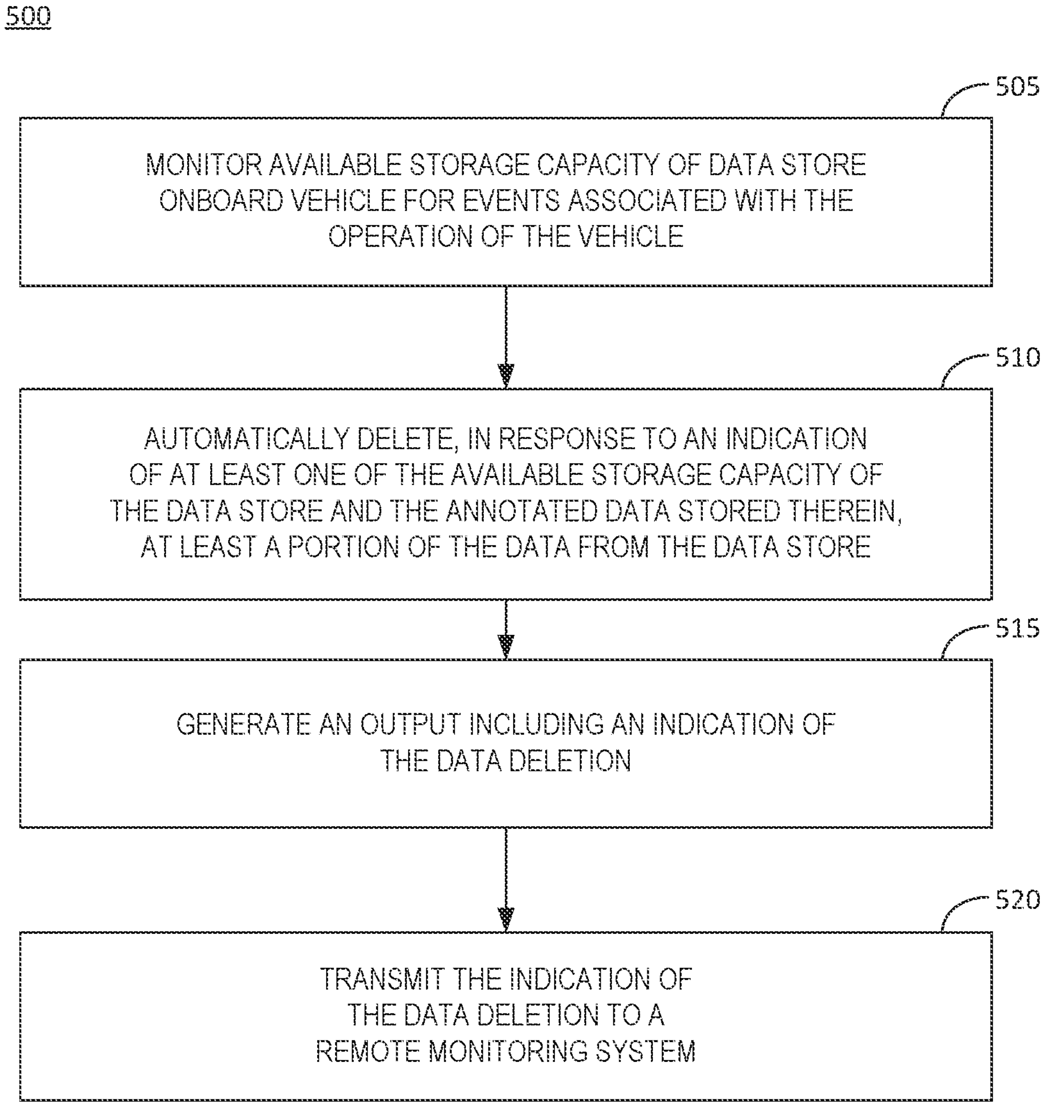
FIG. 5 is an illustrative flow diagram of a process, in accordance with an example embodiment.

FIG. 5 is an illustrative flow diagram of a process, in accordance with an example embodiment. In some embodiments, a framework or system architecture disclosed herein might be used to implement some aspects of process 500. At operation 505, one or more of a system, message, queue, or signal within an AV may be monitored for an indication of an available storage capacity of a data store onboard the vehicle and annotated data stored in the data store. Referring to the example system depicted in FIG. 4 and the corresponding disclosure related thereto above, data manager 405 including expired data manager process 430 and emergency data manager process 455 may monitor data annotator system 410 for annotated data including event data associated with an operation of the vehicle. In some aspects, the annotated data may include an indication whether the subject data should be deleted, an age of the annotated data, and other data annotations. In some aspects, data manager 405 may obtain or determine the available storage capacity of the data store (or one or more drives comprising the data store) onboard the vehicle storage from the AV's data store.

At operation 510, at least a portion of the data from the data store may be automatically deleted in response to an indication of at least one of the available storage capacity of the data store and the annotated data stored therein. For example, if the monitoring of the data annotator system reveals that the available storage capacity of the data store has exceeded the maximum threshold specified by a storage utilization policy for the AV, then actions may be invoked to delete at least some of the data stored in the data store so that the available storage capacity of the data store is in compliance with the storage utilization policy. As another example, if the monitoring of the data annotator system reveals the age of the data exceeds a specified value, then actions may be invoked to delete at least some of the expired data stored in the data store so that the available storage capacity of the data store is further freed to accommodate data files created and stored in the future by the AV. Yet another example includes the monitoring of annotated data from a data transmitter of the AV, where the data transmitter might annotate data that it has previously uploaded or transmitted from the AV. In some aspects, data already transmitted from the AV to a remote monitoring system or other authorized infrastructure might not need to be retained in the AV. Accordingly, data annotated to indicate is has already been successfully transmitted to the remote monitoring system (where it may be securely persisted by the remote monitoring system) may be deleted from the data store of the AV.

Continuing with process 500 at operation 515, an output including an indication of a completion of the automatic deleting of the at least a portion of the data is generated. The generated output may be configured as a data signal, a message, a data record, or other data structure that may be interpreted and understood by a system herein (e.g., FIG. 4, system 400 and one or more subsystems and devices therein) and a system, device, or entity interfacing with a system herein. The output generated at operation 515 may be transmitted to a remote monitoring system, as noted in operation 520. In some aspects, the remote monitoring system referenced in operation 520 may, at least in part, comprise a cloud computing infrastructure or environment.

Figure 6:
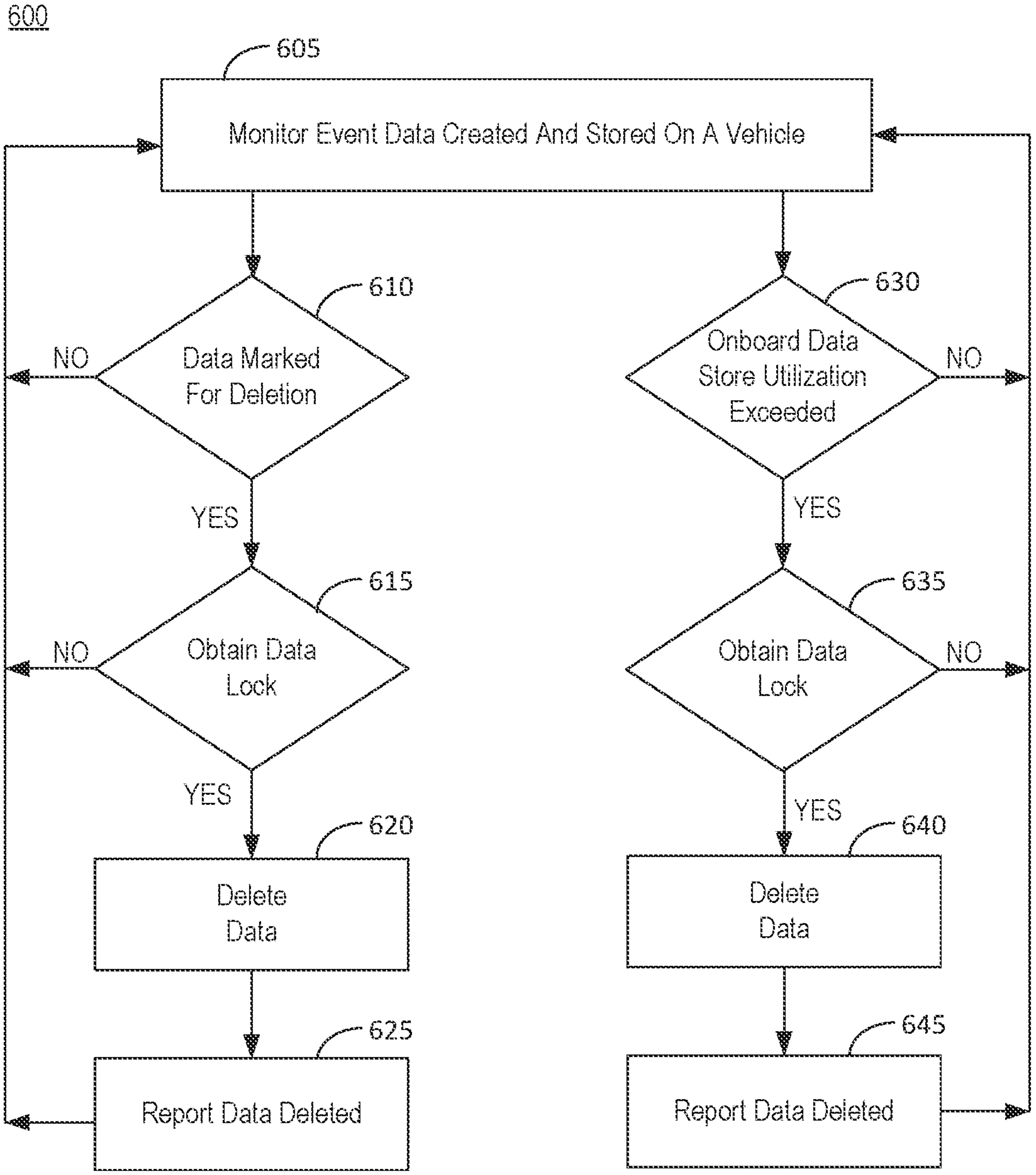
FIG. 6 is an illustrative flow diagram of another process, in accordance with an example embodiment.

Referring to FIG. 6, a framework or system architecture disclosed herein might be used to implement some aspects of process 600 to provide efficient management of data stored in an onboard data store of an AV, in accordance with an example embodiment. At operation 605, event data created and stored on an AV may be monitored. The data may be monitored for indications regarding an available storage capacity of a data store onboard a vehicle and annotated data stored therein. At operation 610, a determination is performed to determine whether the monitored data is marked for deletion. In some aspects, data may be marked or annotated for deletion by a data annotator (e.g., FIG. 4, data annotator system 410) based on one or more factors, such as the data has expired or it is not the type of data that the system is designed to persist long-term in its onboard data store. In some instances, the data may be marked or otherwise annotated for deletion by a data transmitter of the AV (e.g., data transmitter 420) if it has been successfully transmitted or uploaded from the AV to a remote monitoring system or other infrastructure that can securely persist the data, such that the data no longer needs not be retained onboard the AV. If the monitored data is not annotated for deletion as determined at operation 610, then process 600 may return to operation 605. If the monitored data is marked for deletion as determined at operation 610, then process 600 (e.g., via expired data manager process 430 in FIG. 4) may proceed to operation 615 to obtain an exclusive lock on the data (e.g., one or more data files). If the exclusive lock cannot be obtained at operation 615, then the process to delete the subject data file(s) may be ceased and process 600 may return to operation 605. If the exclusive lock is successfully obtained at operation 615, then the process to delete the subject data file(s) may proceed to delete the subject file(s) at operation 620, report the subject file(s) were successfully deleted at operation 625, and return to operation 605.

Referencing operation 605 again, the event data created and stored on the AV may be monitored for indications regarding the available storage capacity of a data store onboard the vehicle. At operation 630, a determination is performed to determine whether the onboard data store utilization policy, as defined for the AV, is exceeded. For example, the onboard data store utilization policy might specify neither the data store nor any of the drives comprising the data store utilize more than 90% of their storage capacity. In the event the specified data store utilization is not exceeded as determined at operation 630, then process 600 may return to operation 605 from operation 630. If the specified data store utilization is exceeded as determined at operation 630, then process 600 (e.g., via emergency data manager process 455 in FIG. 4) may proceed to operation 635 to obtain an exclusive lock on the data (e.g., one or more data files). If the exclusive lock cannot be obtained at operation 635, then the process to delete the subject data file(s) to comply with the data store utilization policy may be terminated and process 600 may return to operation 605 from operation 635. If the exclusive lock is successfully obtained at operation 635, then the process to delete the subject data file(s) may proceed to delete the subject file(s) at operation 640, report the subject file(s) were successfully deleted at operation 645, and return to operation 605.

FIG. 7 is an illustrative depiction of a table 700 representation of a configuration file that might be referenced by a data annotator herein to annotate data, where the annotated data may be monitored or otherwise referenced by a data manager herein and deleted by the data manager depending on the annotations associated with the data. As shown, table 700 includes a listing of requirements 705, as well as criteria 710 and notes 715 related to each of the requirements. For example, the data expiry requirement specifies data greater than 72 hours old and not marked for transmission should be deleted, where the criteria is defined by the data annotator. Also illustrated in the example of FIG. 7, the requirement regarding transmitted data specifies data that has been transmitted to the cloud infrastructure should be deleted, where the criteria for this requirement is defined by the data transmitter. Also depicted in table 700 in FIG. 7, the requirement regarding data store utilization specifies that if the data store utilization exceeds a specified threshold, then a portion of the data should be deleted until compliance with the data store utilization policy is reached. The criteria for this requirement, including the value for the threshold and the order and type of data to delete, may be specified by the data annotator.

In some aspects, a configuration file herein may be written as configurable code deployed on the vehicle. In some instances, the configuration file (or other data structure) referenced and leveraged by a data annotator system herein might be deployed separately to the AV from other code and configuration files. In this manner, this distinct deployment of the configuration file for the data annotator system may be managed independently of other configuration files and process deployments, including the lifecycles of each deployment. For example, the configuration file for the data annotator system might be deployed separately from the self-driving code installed on the AV and updates to the data annotator system's configuration file might not require a change to the AV's self-driving stack.

Figure 8:
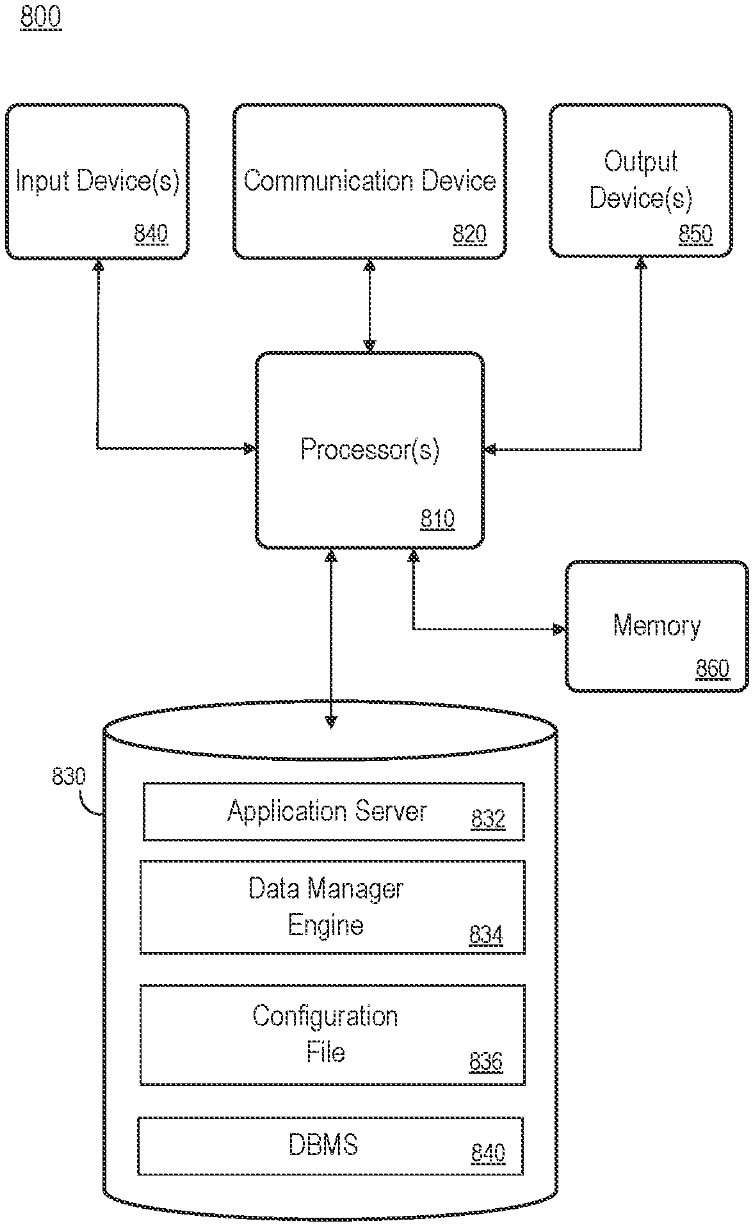
FIG. 8 an illustrative block diagram of a computing system, in accordance with an example embodiment.

FIG. 8 illustrates a computing system 800 that may be used in any of the architectures or frameworks (e.g., FIG. 1, computer 140; FIG. 4, vehicle computing system 400) and processes (e.g., FIGS. 5 and 6) disclosed herein, in accordance with an example embodiment. FIG. 8 is a block diagram of a system embodying the primary compute resource of the AV including a data manager, according to some embodiments. Computing system 800 may comprise a general-purpose computing apparatus and may execute program code to perform any of the functions described herein. Computing system 800 may include other unshown elements according to some embodiments.

Computing system 800 includes processing unit(s) 810 operatively coupled to communication device 820, data storage device 830, one or more input devices 840, one or more output devices 850, and memory 860. Communication device 820 may facilitate communication with external devices, such as an external network, a data storage device, or other data source. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to enter information into computing system 800. Output device(s) 850 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM).

Application server 832 may each comprise program code executed by processor(s) 810 to cause computing system 800 to perform any one or more of the processes described herein. Embodiments are not limited to execution of these processes by a single computing device. Data storage device 830 may also store data and other program code for providing additional functionality and/or which are necessary for operation of computing system 800, such as device drivers, operating system files, etc. Data manager engine 834 may include program code executed by processor(s) 810 to delete certain data stored in a data store of the AV, as disclosed in the one or more processes and various embodiments herein. Configuration file 836 may be referenced by a data annotator in some embodiments herein to efficiently and accurately manage (e.g., delete, etc.) data created and stored by the AV. The configuration file may be defined to specify boundary constraints and values for one or more data management related requirements, including, for example, a data storage data utilization policy, a data retention and expiry policy, and other data storage criteria. Outputs generated by the data manager engine 834 may be stored in a database management system node 840.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A vehicle computing system, comprising:

a memory storing computer instructions;

a data storage device deployed on a vehicle storing annotated data associated with operation of the vehicle; and a processor communicatively coupled with the memory to execute the instructions and during operation of the vehicle, capable of:

monitoring an available storage capacity of a data store onboard a vehicle for a utilization less than a full capacity of the data store and annotated data stored therein, the annotated data stored in the data store including the event data associated with an operation of the vehicle, including data captured by at least one of a first sensor and a device of the vehicle;

automatically deleting, in response to an indication of at least one of the available storage capacity of the data store and the annotated data stored therein, at least a portion of the event data from the data store; and generating an output including an indication of a completion of the automatic deleting of the at least a portion of the event data.

2. The vehicle computing system of claim 1, wherein the event data associated with the operation of the vehicle is generated by at least one device onboard the vehicle.

3. The vehicle computing system of claim 1, wherein the automatically deleting of the at least a portion of the data from the data store is executed based on at least two of a specified data expiry, a storage utilization policy, and a data upload status of the data.

4. The vehicle computing system of claim 3, wherein the storage utilization policy specifies, in an instance the available storage capacity of the data store exceeds a first threshold, at least one of (i) one or more types of data to delete and (ii) an ordered sequence of deleting the one or more types of data.

5. The vehicle computing system of claim 1, wherein the annotated data stored in the data store is annotated to indicate at least one of an age of the stored annotated data and an upload status of the stored annotated data.

6. The vehicle computing system of claim 5, wherein the upload status of the annotated data is determined based on whether the annotated data has been uploaded from the vehicle.

7. The vehicle computing system of claim 1, wherein the processor is further capable of transmitting the output to a remote monitoring system.

8. A method comprising:

monitoring an available storage capacity of a data store onboard a vehicle for a utilization less than a full capacity of the data store and annotated data stored therein, the annotated data stored in the data store including event data associated with an operation of the vehicle, including data captured by at least one of a first sensor and a device of the vehicle;

automatically deleting, in response to an indication of at least one of the available storage capacity of the data store and the annotated data stored therein, at least a portion of the event data from the data store; and generating an output including an indication of a completion of the automatic deleting of the at least a portion of the event data.

9. The method of claim 8, wherein the event data associated with the operation of the vehicle is generated by at least one device onboard the vehicle.

10. The method of claim 8, wherein the automatically deleting of the at least a portion of the event data from the data store is executed based on at least two of a specified data expiry, a storage utilization policy, and a data upload status of the data.

11. The method of claim 10, wherein the storage utilization policy specifies, in an instance the available storage capacity of the data store exceeds a first threshold, at least one of (i) one or more types of data to delete and (ii) an ordered sequence of deleting the one or more types of data.

12. The method of claim 8, wherein the annotated data stored in the data store is annotated to indicate at least one of an age of the stored annotated data and an upload status of the stored annotated data.

13. The method of claim 12, wherein the upload status of the annotated data is determined based on whether the annotated data has been uploaded from the vehicle.

14. The method of claim 8, further comprising transmitting the output to a remote monitoring system.

15. A non-transitory medium having processor-executable instructions stored thereon, which when executed by a processor cause a computer to perform a method comprising:

monitoring an available storage capacity of a data store onboard a vehicle for a utilization less than a full capacity of the data store and annotated data stored therein, the annotated data stored in the data store including event data associated with an operation of the vehicle, including data captured by at least one of a first sensor and a device of the vehicle;

automatically deleting, in response to an indication of at least one of the available storage capacity of the data store and the annotated data stored therein, at least a portion of the event data from the data store; and generating an output including an indication of a completion of the automatic deleting of the at least a portion of the event data.

16. The medium of claim 15, wherein the event data associated with the operation of the vehicle is generated by at least one device onboard the vehicle.

17. The medium of claim 15, wherein the automatically deleting-of the at least a portion of the data from the data store is executed based on at least two of a specified data expiry, a storage utilization policy, and a data upload status of the data.

18. The medium of claim 17, wherein the storage utilization policy specifies, in an instance the available storage capacity of the data store exceeds a first threshold, at least one of (i) one or more types of data to delete and (ii) an ordered sequence of deleting the one or more types of data.

19. The medium of claim 15, wherein the annotated data stored in the data store is annotated to indicate at least one of an age of the stored annotated data and an upload status of the stored annotated data.

20. The medium of claim 19, wherein the upload status of the annotated data is determined based on whether the annotated data has been uploaded from the vehicle.

* * * * *